United States Patent [11] 3,630,715

[72] Inventor Alvin Guttag
 Bethesda, Md.
[21] Appl. No. 785,404
[22] Filed Dec. 19, 1968
[45] Patented Dec. 28, 1971
[73] Assignee Weston Chemical Corporation
 New York, N.Y.

[54] ALKYLENE BIS (PHENOXYACETIC ACID) DERIVATIVES AS HERBICIDES
 8 Claims, No Drawings

[52] U.S. Cl.................................................. 71/109,
 71/88, 71/116, 424/131, 424/134, 424/151,
 424/308, 424/186, 242/195, 424/205, 424/218,
 424/226, 424/285, 424/304, 424/316, 424/317,
 260/347.4, 260/473 G, 260/520, 260/619 A
[51] Int. Cl....................................................... A01n 9/24
[50] Field of Search............................................. 71/108,
 112, 109, 116; 260/473, 520

[56] References Cited
 UNITED STATES PATENTS

| | | | |
|---|---|---|---|
| 3,499,008 | 3/1970 | Talet et al. | 71/107 |
| 2,396,513 | 3/1946 | Jones | 71/116 |
| 2,482,706 | 9/1949 | Day | 260/473 |
| 2,541,003 | 2/1951 | Day et al. | 260/520 |

FOREIGN PATENTS

| 1,404,919 | 5/1965 | France | 260/473 |
|---|---|---|---|

OTHER REFERENCES

Godt, Jr. et al., " Derivatives of 4,4' -isopropylidenebis, (2,6-dichlorophenol) 1967, CA 66, No. 115386K (1967)

Trojna et al., " Some New Derivatives of $\beta,\beta,\beta$-trichloro-$\alpha,\alpha$-bis(4-hydroxphenyl)ethane" CA51 p. 11297 (1957)

*Primary Examiner*—Lewis Gotts
*Assistant Examiner*—G. Hollrah
*Attorney*—Cushman, Darby & Cushman ABSTRACT: Herbicides and insecticides of the formula

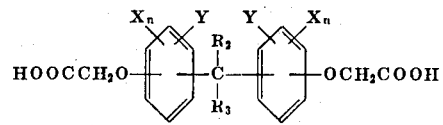

where $n$ is 0, 1 or 2, X and Y are halogen or hydrogen, $R_2$ is hydrogen or methyl and $R_3$ is methyl or trihalomethyl are provided.

ALKYLENE BIS (PHENOXYACETIC ACID) DERIVATIVES AS HERBICIDES

This invention relates to new compounds which have herbicide-insecticide properties. More particularly, the invention relates to novel Bis phenoxy acetic acid compounds and derivatives thereof which are selective herbicides and in some cases also are insecticides.

Many herbicides are known to the art and vary in activity toward a variety of plants in both pre- and post-emergence applications. A widely used herbicide is 2,4-D(2,4-dichlorophenoxyacetic acid) and the salts and esters thereof. 2,4-D is very effective at low concentrations on most broad-leafed plants and relatively ineffective on narrow-leafed plants. Also, 2,4-D is very effective as a postemergence herbicide and relatively less effective as a preemergence herbicide. Accordingly, 2,4-D has found wide application as an agricultural herbicide since it can be applied to large fields in a rather noncritical manner for effective weed control.

However, 2,4-D is not particularly selective in effect and almost all broad-leafed and even some seminarrow and narrow-leafed plants are affected thereby, especially at higher application rates. Also, 2,4-D is quite stable and will persist for extended periods of time. Under the circumstances, 2,4-D must be restricted in use with a large number of crops, notably among which are tomatoes and cotton. Further, grass weeds such as setaria, Johnson grass, oats and wheat cannot be controlled by 2,4-D and these are, of course, particularly troublesome weeds in many crop fields, such as tomato and cotton fields. Also, since 2,4-D persists for extended time periods, a field that has been treated with 2,4-D for control of broad-leafed plants cannot be safely used immediately, subsequent to the harvesting of a first crop, as a field for growing a second broad-leafed crop, e.g. tomatoes and cotton.

A number of herbicides have been made which exhibit more selectivity than 2,4-D and which will function only as a preemergence or postemergence herbicide. These herbicides, however, only partially solve the problems associated with the use of 2,4-D in that they are not sufficiently herbicidal and are not sufficiently selective and/or are present too long to allow the planting of subsequent crops, as noted above, without fear of insufficient weed control or damage to the crop being treated or to subsequent crops planted.

Accordingly, it is an object of the present invention to provide herbicides which are quite selective and will not persist for extended periods and hence will not unduly retard the growing of crops in later seasons. Another object is to develop herbicides which function only as a postemergence herbicide. It is further object to provide herbicides which are also insecticides and will control weeds and insects commonly found in many crop fields. Yet another object is to develop novel insecticides. Other objects will be apparent from the following disclosure and claims.

Broadly stated the compounds of the present invention are the acids of the formulas (1)
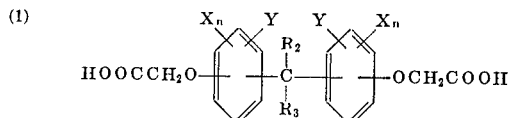

the alkyl, alkoxyalkyl and aryl esters thereof and the alkali metal, alkaline earth metal and amine salts thereof, where X is halogen, e.g. chlorine, bromine, fluorine, $n$ is 0, 1 or 2 and Y is halogen or hydrogen, $R_2$ is hydrogen or methyl and $R_3$ is methyl or trihalomethyl.

Depending upon the value of $n$ (the number of X's), whether Y is halogen or hydrogen and the substituents $R_2$ and $R_3$, the compounds have different properties and utilities. Hence when $R_2$ and $R_3$ are methyl and $n$ is 2, the compounds are herbicides. However, when $R_2$ is hydrogen or methyl, $R_3$ is trihalomethyl and $n$ is 2, the compounds are both herbicidal and insecticidal. But when $R_2$ is hydrogen, or methyl, $R_3$ is trihalomethyl and $n$ is 0 or 1, the compounds are only insecticidal.

Hence the acid form of the herbicides has the formula:

(2)
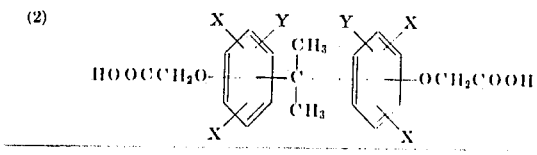

The acid form of the herbicides-insecticides has the formula:

(3)
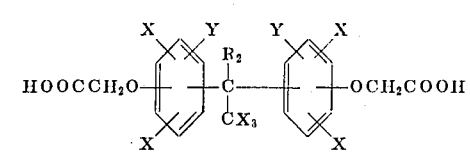

The acid form of the insecticides has the formula:

(4)

or (5)

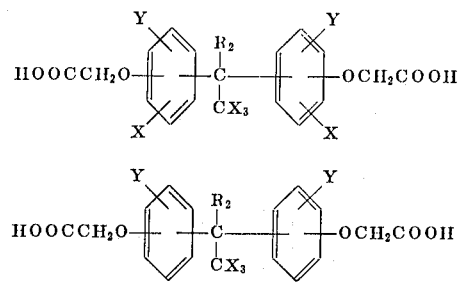

where $R_2$, Y and X are as above.

Of course where Y is hydrogen the acid form of the insecticides will have the formula:

(6)
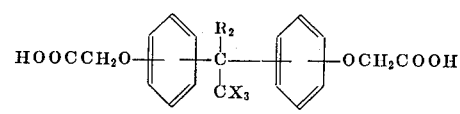

As noted above, the compounds may be in the form of the esters and salts as well as the acids and the general formulas will then be

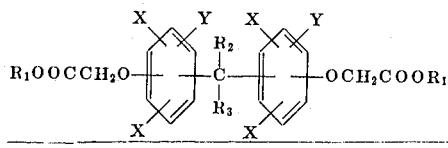

where $R_1$ is H, alkyl, aryl, amino, alkali metal and alkaline earth metal. $R_1$ may be an ester-forming group such as straight or branched or halogenated alkyl of up to 20 carbon atoms, e.g. methyl, ethyl, propyl, hexyl, butyl, amyl, octyl, decyl, dodecyl, hexadecyl, octadecyl, isopropyl, isohexyl, isodecyl, 2-ethyl hexyl, chloromethyl, chlorohexyl, chlorododecyl, bromoisohexyl, bromododecyl and fluoroethyl or their secondary forms such as isobutyl, isopropyl, isooctyl or mixed esters thereof. Or the ester-forming group may be phenyl or halo substituted phenyl such as monochlorophenyl, dichlorophenyl, monobromo and dibromo and fluorophenyl, straight or branched chain alkyl phenyl with up to 18 carbon atoms in the alkyl chain such as methyl phenyl, ethyl phenyl, hexyl phenyl and octyl phenyl. The more convenient forms of the esters are the methyl, ethyl, propyl, butyl, amyl, octyl, decyl, (or the secondary forms thereof, e.g. isobutyl, isopropyl, isooctyl), butoxyethyl, propylene glycol butyl, 2-ethylhexyl, butoxypropyl, 3-(2-butoxyethoxy) propyl, tert-octyl, tetrahydrofurfuryl esters. Also convenient are the straight chain glycol esters, e.g. propylene glycol butyl ether ester, dipropylene glycol esters and butoxy ethoxy propanol ester. $R_1$ may also be a salt-forming group such as an alkali metal or alkali earth metal, e.g. sodium, potassium, lithium, cesium, magnesium, calcium, and barium. The salt-forming group may be an ammonium salt or an amine, where the amine used is of the formula:

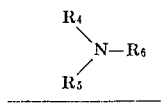

where $R_4$, $R_5$ and $R_6$ may be the same or different and are suitably hydrogen, alkyl of up to 18 carbon atoms, aryl or halo substituted alkyl of up to 18 carbon atoms or halo substituted aryl or alkaryl of up to 18 carbon atoms in the alkyl chain, e.g. methyl, ethyl, propyl, butyl, hexyl, decyl, dodecyl, octadecyl, isopropyl, isodecyl, isooctadecyl, phenyl, chloro or bromo phenyl, dichloro or dibromo phenyl, p-methyl phenyl, o-ethyl phenyl, m-hexyl phenyl and p-octylphenyl. For example suitable amines (including ammonia) are the alkanolamines such as di- and trimethylamine, di- and triethylamine, isopropylamine, dibutyl amine, di- and triethanolamines, isopropanolamine, methyl phenyl amine, dimethyl phenyl amine, diphenyl amine and triphenyl amine.

Examples of compound (2) are: 4,4'-isopropylidene bis (2,6-dichlorophenoxyacetic acid), 4,4'-isopropylidene bis (2,6-dichlorophenoxy sodiumacetate), 4,4'-isopropylidene bis (2,6-dichlorophenoxy potassiumacetate), 4,4'-isopropylidene bis (2,6-dichlorophenoxy ethylacetate), 4,4'-isopropylidene bis (2,6-dichlorophenoxy butylacetate), 4,4'-isopropylidene bis (2,6-dichlorophenoxy isooctylacetate), 4,4'-isopropylidene bis (2,6-dibromophenoxy phenylacetate), 4,4'-isopropylidene bis (2,5-dibromophenoxy isodecylacetate), 4,4'-isopropylidene bis (3,5-dichlorophenoxy ammonium acetate), 4,4'-isopropylidene bis (3,6-difluorophenoxy acetic acid), 4-(2,6-dichlorophenoxy methylacetate)-4'-(2,6-dichlorophenoxy phenylacetate), propylidene 4,2'-isopropylidene bis (2,6-dichlorophenoxyacetic acid), 3,3'-isopropylidene bis (2,5-dibromophenoxy methyl acetate), 4,4'-isopropylidene bis (2,5-dichlorophenoxy triethylamine acetate), 4,4'-isopropylidene bis (2,3,6-trichlorophenoxy isooctyl acetate), 4,4'-isopropylidene bis (2,6-dichlorophenoxy calcium acetate), 4,4'-isopropylidene bis (2,6-dichlorophenoxy butoxyethyl acetate), 4,4'-isopropylidene bis (2,5-dichlorophenoxy 2-chloroethyl acetate), 4,4'-isopropylidene bis (2,5-dichlorophenoxy 4-chlorophenyl acetate), 4,4'-isopropylidene bis (2,6-dichlorophenoxy octadecyl acetate), 4,4'-isopropylidene bis (2,6-dichlorophenoxy oleyl acetate), 4,4'-isopropylidene bis (2,6-dichlorophenoxy allyl acetate).

The same compounds noted above will serve to exemplify the compounds of formulas (3), (4), (5) and (6) except that the compounds are, of course, the 1,1,1-trihalo ethylidene compounds, and in connection with formula 4 the phenoxy nucleus is of course mono or di halo substituted and in connection with formula (5) is monosubstituted or unsubstituted by halogen as shown by formula (6), e.g. 4,4'-1,1,1-trichloroethylidene bis (2,6-dichlorophenoxy acetic acid) (and the corresponding sodium and triethanolamine salts) 4,4'-1,1,1-trichloroethylidene bis (2-chlorophenoxy acetic acid), and 4,4'-1,1,1-trichloroethylidene bis (phenoxy acetic acid), 4,4'-1,1,1-trichloroethylidene bis (phenoxy acetic acid), and the corresponding above-noted esters and salts, e.g., 4,4'-1,1,1-trichloroethylidene bis (phenoxy isooctylacetate).

The compounds of the invention may be prepared in several fashions. Thus, two moles (plus a slight excess, e.g. up to 15 percent) of chloroacetic acid are reacted with 1 mole of (a) bisphenol A or (b) halo substituted bisphenol A, preferably in a suitable solvent. The various position isomers of the halo substituted bisphenol A, if not readily available to the practitioner, may be easily prepared by known methods such as the reaction between the corresponding halo substituted phenol, e.g. 2,5-dichlorophenol, 3,5-dichlorophenol, 2,5,6-trichlorophenol and the corresponding aldehyde or ketone, e.g. chloral or acetone (see Organic Syntheses, Migrdichian, Reinhold Publishing Co. (1957) pp. 235-237). The reaction is illustrated below in connection with chloroacetic acid and tetrachlorobisphenol A (in which the chlorine atoms are predominantly in the 2,6,2',6' positions):

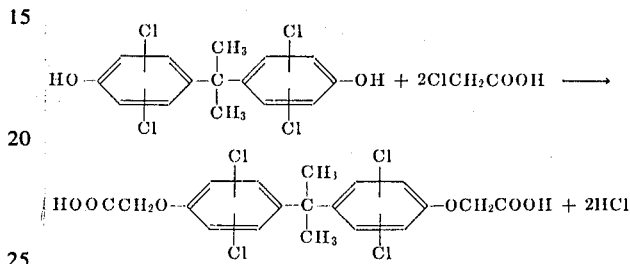

The acid may in turn be reacted with alkali metal, alkali metal hydroxide, an alkali earth metal, an alkaline earth metal hydroxide, an amine, $R_5R_6NH$ or an alcohol $R_7OH$ to produce the salt, amine salt or ester, respectively, where $R_5$ and $R_6$ are as above and $R_7$ is alkyl or aryl or alkoxyalkyl as defined above in connection with the esters of the present compounds.

Alternately, the alkali metal salts of both the chloroacetic acid and the tetrahalo bisphenol may be reacted in the same manner. The free dibasic acid is then obtained by simply acidifying the suspension of the alkali metal salt produced with a mineral acid, e.g. HCl $H_2SO_4$ or the ester is made by reacting the alkali metal salt with an alcohol.

Furthermore, the products may be produced by reacting 2 moles of a halo phenol with 1 mole of a halo aldehyde and this produce reacted with chloroacetic acid, both reactions are preferably carried out in a solvent. This reaction is illustrated below in connection with 2,6 dichlorophenol and chloral:

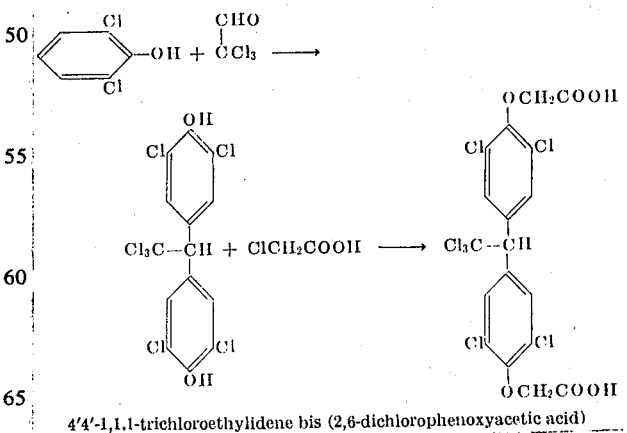

4'4'-1,1,1-trichloroethylidene bis (2,6-dichlorophenoxyacetic acid)

By treating the above acid with $R_7OH$, $R_5R_6NH$ or the salt forming group as disclosed above, the ester, amine salt or salt is obtained.

Alternately, the ketone may be used in the reaction according to that shown below:

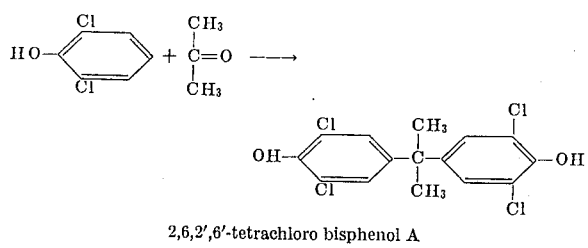

2,6,2',6'-tetrachloro bisphenol A

Or, if desired, the unsubstituted phenol may be used in the above reaction to produce bisphenol A, which may be in turn rendered molten and reacted with chlorine gas, in the known manner, to provide a mixture of the chlorine-substituted isomers, the main isomer being the 2,6-isomer. Alternately, the phenol may be first chlorinated by rendering the phenol molten and reacting with chlorine gas. The products so produced will be a mixture of isomers, but the main isomers are the 2,4 and 2,6-isomers. If desired, catalysts, e.g. $FeCl_2$, $AlCl_3$ and $SbCl_3$, may be used along with a solvent, e.g. $CCl_4$, acetic acid and water, in carrying out the reaction, but this is not necessary.

The herbicides and herbicide-insecticides of the invention may be formulated into compositions which may be powders, dusts, granular products, liquids solutions, dispersions or pastes. The liquid can be water or organic solvents, e.g. kerosene, benzene, xylene, diesel oil, fuel oil, petroleum naphtha, perchloro ethylene, butyl acetate, etc.

The active substances may be put up in dry form, impregnated on inert carriers for dust application, as dry powders, or in solid form, as in blocks or bars, pellets, granules, cakes or dry fertilizer mixes. The dry forms may be diluted with inert dry carriers, for example, talc, or may be diluted in water for spray application. Wetting agents and dispersing agents may be added to the dry forms as required, or alternately, wetting agents may be added to the liquid forms.

The compositions, formulated as above, are usually diluted for the purposes of application to the crops and applied to the locus to be treated at a rate in the range of from about 2 oz. to about 20 pounds of the total active substance by weight of the ingredients of the composition per acre. While the preferred liquid diluent is water, the solid diluent may be as desired, e.g. dirt, talc, fullers earth, fertilizer, bentonite, lime, etc. Generally the active ingredients are diluted to a weight percent of active ingredients of from 1 percent to 50 percent although as little as 0.00001 percent or only the active ingredient itself may be used if desired. The compounds can be employed as aerosols, e.g. by dispersing them in air by means of a compressed gas such as dichlorodifluoromethane.

Typical wetting agents include sodium alkyl benzene sulfonates having 10 to 18 carbon atoms in the alkyl group, p-isooctylphenol-10 ethylene oxide adduct, sodium lignin sulfonate, sodium lauryl sulfate and sodium stearate.

Alternately an alkali metal salt of isopropylidene diphenol, a halohydrin and an alkali metal salt of a halo acetic acid may be reacted and the free acid obtained by treatment with a strong acid. This will produce the halo unsubstituted acid which may be subsequently halogenated as noted above.

The compounds, use and methods of producing the compounds of the invention will be illustrated by the following examples where all parts are by weight unless otherwise noted. However, it should be understood that the invention is not limited to the specific examples but applicable to the extent of the foregoing disclosure.

EXAMPLE 1

Preparation of
4,4'-ISOPROPYLIDENE BIS (2,6-DICHLOROPHENOXYACETIC ACID)

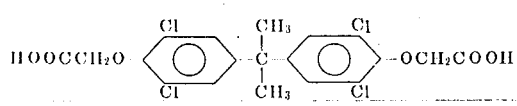

The disodium salt of 4,4'-isopropylidene bis (2,6-dichlorophenoxyacetic acid) was prepared by reacting the disodium salt of tetrachlorobisphenol A in aqueous solution with the sodium salt of chloroacetic acid in aqueous solution.

The free dibasic acid was obtained on acidification of an aqueous suspension of the disodium salt. The details of the reaction are as follows:

| | SOLUTION A | |
|---|---|---|
| 1,500 ml. | Water | |
| 366 g. | Tetrachlorobisphenol | (1 Mole) |
| 83 g. | Sodium hydroxide, Tech. (2 Mole, NaOH) | |
| 2 g. | Potassium Iodide | |

Solution A was heated to reflux temperature until all solids were dissolved. It was stirred and maintained at 98°–100° C. while cold solutions, B, C, and D respectively of sodium chloroacetate were added. Solutions B, C, and D were maintained below 40° C. at all times, both during preparation and use.

| | SOLUTION B | |
|---|---|---|
| 1,000 ml. | Water | |
| 200 g. | Chloroacetic acid (2 | Moles + 5%) |
| 86 g. | Sodium Hydroxide (Tech. | Flake) |

One hour was required for the addition of Solution B. The resulting reaction mixture was then heated at 94°–96° C. for an additional 50 minutes.

| | SOLUTION C |
|---|---|
| 250 ml. | Water |
| 50 g. | Chloroacetic acid |
| 21 g. | Sodium Hydroxide |

Solution C was added in 15 minutes and the reaction mixture heated at 94+–96° C. for 1 hour.

| | SOLUTION D |
|---|---|
| 125 ml. | Water |
| 30 g. | Chloroacetic acid |
| 13 g. | Sodium Hydroxide |

Solution D was added in 15 minutes. Heating was then continued for 30 minutes, at which time solids began crystallizing. Heating was stopped and stirring continued for 2 hours. The reaction mixture was allowed to stand overnight at room temperature, the solids then separated by filtration and washed free of chloride ion. The dry solid produce weighed 426 g. for a yield of 78 percent of theory. The dry solid product was suspended in 2 liters of boiling water and then acidified by adding concentrated hydrochloric acid. The water insoluble oil which separated was washed free of chloride ion by small portions of hot water. Molecular Weight, 482; Chlorine, 30.5 percent.

EXAMPLE 2

Preparation of

THE DIBUTYL ESTER

The 4,4'-isopropylidene bis (2,6-Dichlorophenoxyacetic acid) prepared by the procedure of example 1, without further purification, was used to prepare the dibutyl ester and the dimethylamine salt as follows:

| | DIBUTYL ESTER |
|---|---|
| 185 g. | Of the acid |
| 400 g. | n-Butanol |
| 200 g. | Toluene |
| 2 g. | Conc. sulfuric acid |

This mixture was heated to reflux temperature and 30 ml. water removed as an azeotrope using a sidearm. The product was then washed with three portions of hot water and finally stripped at 140° C. and 10 mm. pressure. 184 g. of viscous, light tan, product was recovered. Molecular Weight, 594; Chlorine, 24.3 percent.

EXAMPLE 3

DI-DIMETHYLAMINE SALT

| 70 g. | Of the acid |
| --- | --- |
| 200 ml. | Anhydrous dimethylamine |

These reactants were thoroughly mixed at 5° C. and then allowed to stand overnight at 5° to 10° C. The solid which formed was finely pulverized in a mortar, cooled again to 5° C. and 50 g. liquid. Dimethylamine added and ground with the solid. The finely pulverized product was allowed to warm to room temperature and freed of excess dimethylamine. The product weighed 79 g. Molecular weight, 572; Chlorine, 25.2 percent.

EXAMPLE 4

Concentrated sulfuric acid is added dropwise to a well-stirred acetic acid solution of 2 moles of 2,6-dichlorophenol and 1 mole of chloral, at such a rate that the temperature does not exceed 40° C. External cooling is provided to assure the correct temperature. When further addition of sulfuric acid does not cause a further increase in temperature, the reaction is essentially complete. The mixture is allowed to stand for 3 hours.

The reaction mixture is poured into water and the crystalline solids are recovered therefrom by filtering. The solids are recrystallized from ether to obtain a mixture of the position isomers of 4,4'-1,1,1-trichloroethylidene bis (2,6-dichlorophenol), i.e. (HOC₆H₄Cl₂)₂CHCCl₃. The so obtained bisphenol was converted to the disodium salt and reacted according to the procedure of example 1 with the sodium salt of chloroacetic acid to obtain the corresponding salt, i.e. the disodium salt of 4,4'-1,1,1-trichloroethylidene bis (2,6-dichlorophenoxy acetic acid). This salt was then acidified with HCl to form the free dibasic acid. The procedure of example 1 and with the same mole ratios was used in the reaction and a mixture of the position isomers was formed, but principally the product is the 4,4'-1,1,1-trichloroethylidene bis (2,6-dichlorophenoxy acetic acid) isomer.

The following examples demonstrate the herbicidal properties of representative compounds of the invention.

EXAMPLE 5

An approximately 1.5 w/w percent dilution of the dibutyl ester, prepared as by example 2, was emulsified in an approximately equal mixture of Butyl Carbitol Acetate (diethylene glycol monobutyl ether acetate) and Velsicol solvent (aromatic petroleum solvents of straight chain structure which have been cyclized). The composition was applied to pigweed, setaria, Johnson grass, morning glory, tomatoes, oats, wheat, cucumber, red kidney beans and cotton in a post emergence test where the scale is 0 to 10 with 0 being no affect and 10 being complete destruction. As a reference for the activity of the composition the same plants were treated with a common selective herbicide, K armex, which is 3-(p-chlorophenyl)-1,1-dimethylurea. Also as a "check," the same plants under the same conditions were not treated with any herbicide, and as shown, all plants remained alive in the check. The results are shown in table I.

EXAMPLE 6

The procedure of example 5 was repeated with the amine salt, prepared as by example 3. The amine salt was dissolved in water to provide an approximately 1.5 w/w percent solution. The results are shown in table 1.

TABLE 1.—POST EMERGENCE HERBICIDAL EVALUATION

| Chemical | Dose, lbs./acre | Pig weed | Setaria | J. grass | M. glory | Tomatoes | Oats | Wheat | Cucs. | R.K.B. | Cotton |
| --- | --- | --- | --- | --- | --- | --- | --- | --- | --- | --- | --- |
| Dimethyl amine salt | 5 | 3 | 7 | 6 | 0 | 0 | 10 | 10 | 8 | 3 | 0 |
|  | 2.5 | 2 | 0 | 0 | 0 | 0 | 5 | 6 | 7 | 2 | 0 |
|  | 1.25 | 0 | 0 | 0 | 0 | 0 | 4 | 4 | 7 | 0 | 0 |
| Butyl | 5 | 3 | 2 | 2 | 5 | 3 | 10 | 4 | 9 | 9 | 3 |
|  | 2.5 | 3 | 0 | 0 | 3 | 0 | 8 | 2 | 7 | 5 | 0 |
|  | 1.25 | 2 | 0 | 0 | 2 | 0 | 5 | 1 | 7 | 2 | 0 |
| Karmex | 2 | 10 | 9 | 7 | 6 | 7 | 6 | 6 | 10 | 10 | 3Y |
| Check |  | 0 | 0 | 0 | 0 | 0 | 0 | 0 | 0 | 0 | 0 |

Note.—Y=yellowing.

As is known, the normal response from 2,4-D would be to have complete kill of pigweed, morning glory, tomatoes, cucumbers, red kidney beans and cotton at the 1.25 pound rate with both the amine and ester. Also with 2,4-D the grass plants which include setaria, Johnson grass, oats and wheat would be completely unaffected at the lowest rate. As can be seen from table 1, the results obtained with the present compositions are at variance with the 2,4-D pattern and therefore the compositions are substantially different in response than 2,4-D. The herbicidal effect is, however, very pronounced in wheat, oats and cucumbers. Cotton and tomatoes are perhaps among the most sensitive plants to 2,4-D but were unaffected by the present compositions. The fact that cotton and tomatoes were unaffected by the amine salt and only slightly affected at high doses of the ester shows that there is a completely different biological response with the present compositions as compared with the 2,4-D materials.

Accordingly, the present compositions may be applied to growing crops such as tomatoes and cotton to rid the crops of common weeds without danger of damage to the crops. Such selectivity is of great importance especially when large fields of growing crops must be weeded in relatively short times and under conditions which do not admit to carefully controlled placement placement of the herbicide.

EXAMPLE 7

In order to illustrate the lack of preemergence activity of the present compounds, the same amine salt and butyl ester compositions, as described in examples 5 and 6, were used to drench the surface of ground having tomato and cotton seeds therein. Also a "check" and reference selective herbicide, Karmex, were used to evaluate the present compositions, in a manner discussed in example 5. The results are shown in table 2 where G. stands for the percent of plants which germinated and P.R. stands for the phytotoxicity. Note that the untreated plants of the check have an 85 percent germination.

TABLE 2

PREEMERGENCE HERBICIDAL EVALUATION

| Chemical | Dose 0/AC. | Variable | Tom. | Cot. |
| --- | --- | --- | --- | --- |
| Dimethyl Amine Salt | 10 | G. | 85 | 85 |
|  |  | P.R. | 0 | 0 |
|  | 5 | G. | 85 | 85 |
|  |  | P.R. | 0 | 0 |
|  | 2.5 | G. | 85 | 85 |
|  |  | P.R. | 0 | 0 |
| Butyl Ester | 10 | G. | 80 | 85 |
|  |  | P.R. | 0 | 0 |
|  | 5 | G. | 85 | 85 |
|  |  | P.R. | 0 | 0 |
|  | 2.5 | G. | 85 | 85 |
|  |  | P.R. | 0 | 0 |
| Karmex | 2 | G. | 10 | 10 |
| Check | — | G. | 85 | 85 |
|  |  | P.R. | 0 | 0 |

As can be seen from table 2, the present compositions do not inhibit the germination of the tomato and cotton plants while Karmex completely inhibited the same. While not being bound by theory, it is believed that this result is obtained because of the relatively great rate of breakdown of the present compositions as compared with Karmex and 2,4-D compounds which are relatively inert and resist decomposition for long times.

Hence a field could be weeded by applying the compositions of the invention and thereafter tomatoes or cotton could be planted without fear of inhibiting their germination and growth thereof.

The compounds of formula 3 are also insecticides as well as herbicides and the compounds of formulas 4 and 5 are insecticides for many insects, among which are included the common pests such as the Mexican bean beetle, cockroaches, flies (e.g. Musca domestica) and mosquito larvae. By the term insect it is intended to include not only the members of the class Insecta but also related or similar nonvertebrate animal organisms belonging to allied classes of arthropods and including mites, ticks, spiders, wood lice, and the like.

For employing the compounds of the invention in combating insects and similar pests there can be employed the usual procedures familiar to those skilled in the art. For example, the agents may be sprayed or otherwise applied in the form of solutions or dispersions, or adsorbed on inert finely divided solids and applied as dusts. Solutions of the novel insecticides suitable for application by spraying, brushing, dipping, or the like can be prepared using as the solvent any of the well-known horticultural carriers, such as kerosene, or similar light mineral oil distillates of intermediate viscosity and volatility. Adjuvants, such as spreading or wetting agents, may be included in the solutions, such as fatty acid soaps, rosin salts, The concentration of the active ingredient to be used with the above carriers will be dependent upon many factors, such as the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.01 percent to about 0.5 percent by weight, based upon the total weight of the composition, although depending upon the circumstances as little as about 0.00001 percent or as much as 50 percent or even more of the active ingredient may be employed.

The toxic agents of this invention may be employed as the sole toxic ingredient of the insecticidal composition or they may be employed in conjunction with other insecticidally active materials. Such other insecticidally active materials include, without being limited to, the naturally occurring insecticides, such as pyrethrum, rotenone, sabadilla, and the like, as well as synthetic materials such as compounds of arsenic, lead, and/or fluorine; DDT, benzene hexachloride, thiodiphenylamine, cyanides, tetraethyl pyrophosphate, 0,0-diethyl-0-p-nitrophenyl thiophosphate, azobenzene, and the like.

Generally speaking the topical $LD_{50}$ for insects is less than 500 mg./kg., e.g. 1 to 400 and especially 1 to 50 mg./kg. and good kills are obtained with dosages within these ranges.

EXAMPLE 8

The compounds shown below in table 3 are applied by dusting at the dosages shown to Musca domestica. The kills are rated at 0 through 4, where 0 is less than 10 percent kills, 1 is less than 30 percent kills, 2 is less than 50 percent kills, 3 is less than 70 percent kills and 4 is 70 percent kills and above.

TABLE 3

| Compound | Kill rating at specified dosages in mg/kg. | | | |
|---|---|---|---|---|
| | 500 | 400 | 100 | 50 |
| 1. 4,4'-1,1,1-trichloroisoethylidene bis (2,6-dichlorophenoxy acetic acid) | 4 | 4 | 4 | 3 |
| 2. 4,4'-1,1,1-trichloroisoethylidene bis (3,-chlorophenoxy acetic acid) | 4 | 4 | 3 | 3 |
| 3. 4,4'-1,1,1-trichloroisoethylidene bis (3,6-phenoxy acetic acid) | 4 | 4 | 3 | 3 |
| 4. 4,4'-1,1,1-trichloroethylidene bis (3,5,6-dichlorophenoxy acetic acid) | 4 | 4 | 4 | 4 |
| 5. 4,4'-1,1,1-trichloroethylidene bis (2-bromophenoxy acetic acid) | 4 | 4 | 3 | 3 |
| 6. 4,4'-1,1,1-trichloroethylidene bis (2,5-bromophenoxy acetic acid) | 4 | 4 | 3 | 3 | saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines and ammonium salts, and the like. The solution may be dispersed or emulsified in water and the resulting dispersion or emulsion applied as the spray. Solid carrier materials which can be employed include talc, bentonite, lime, gypsum, pyrophyllite, and the like inert solid diluents. The compounds also may be applied as aerosols, as by dispersing them into the air by means of a compressed gas. The more volatile of the compounds may be employed as fumigants, although they have only a low volatility and hence are less effective when employed in this manner. The toxic agents of the invention can also be applied in agricultural uses.

The compounds of the invention have the advantage over DDT of not remaining for long periods of time after an area has been sprayed.

EXAMPLES 9 THROUGH 22

To further illustrate the compounds of the present invention example 1 is repeated except that the tetrachlorobisphenol A was replaced in the same mole amount with the compounds set forth in table 4 and the bis chlorophenoxy acetic acid products obtained had the physical form noted below in table 4. The compounds of examples 9 through 15 were converted to the diethyl amine salt and showed herbicidal activity similar to that of the amine salt of example 6. The compounds of examples 16 through 22 showed insecticidal activity toward Musca domestica similar to that of example 8.

TABLE 4

| Example | Starting compound | Product | | |
|---|---|---|---|---|
| | | Vicose Liquid | Solid | Liquid |
| 9 | 2,5,2',5'-tetrachlorobisphenol A | | | X |
| 10 | 2,5,6,2',5',6'-hexachlorobisphenol A | | | X |
| 11 | 3,5,3',5'-tetrachlorobisphenol A | | | X |
| 12 | 2,3,2',3'-tetrachlorobisphenol A | | | X |
| 13 | 2,3,5,2',3',5'-hexachlorobisphenol A | | | X |
| 14 | 2,6,2',6'-tetrachlorobisphenol A | | | X |
| 15 | 3,6,3',6'-tetrachlorobisphenol A | | | X |
| 16 | 1,1,1-trichloroethylidene bisphenol | X | | |
| 17 | 1,1,1-trichloroethylidene bis (2-dichlorophenol) | | X | |
| 18 | 1,1,1-trichloroethylidene bis (2,5-tetrachlorophenol) | | X | |
| 19 | 1,1,1-trichloroethylidene bis (2,5,6-hexachlorophenol) | | X | |
| 20 | 1,1,1-trichloroethylidene bis (3,5-tetrachlorophenol) | | X | |
| 21 | 1,1,1-trichloroethylidene bis (2,3-tetrachlorophenol) | | X | |
| 22 | 1,1,1-trichloroethylidene bis (2,3,5-hexachlorophenol) | | X | |

What is claimed:

1. A process for the selective control of weeds comprising applying to weeds at a rate equivalent to 2 oz. to 20 lbs. per acre of a herbicide which is a post emergent, selective herbicidal composition containing an effective amount of at least one herbicidal compound of the formulas:

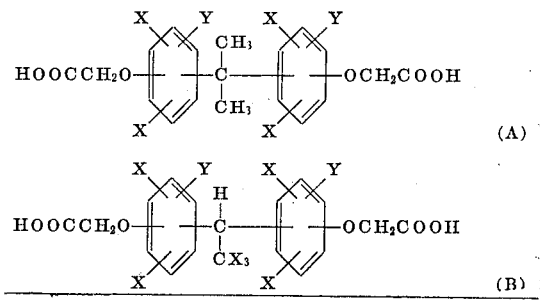

and the alkali metal, alkaline earth metal and ammonium or amine salts thereof where the salt-forming amine is of the formula $R_4R_5NR_6$ and $R_4$, $R_5$ and $R_6$ may be the same or different and selected from hydrogen, alkyl, hydrocarbyl alkaryl and hydrocarbyl aryl, or halo alkyl, hydrocarbyl haloalkaryl and hydrocarbyl haloaryl all of which may be up to 18 carbon atoms; and the alkyl, alkoxyalkyl or haloalkyl esters thereof wherein the alkyl group is up to 20 carbon atoms; and the phenyl, halophenyl or alkyl phenyl esters thereof wherein the alkyl group is up to 18 carbon atoms; and where X is halogen and Y is halogen or hydrogen; the remaining portion of the composition being selected from at least one of inert diluents or carriers and wetting agents.

2. A process according to claim 1 wherein the herbicidal composition is applied to weeds in the presence of tomato plants.

3. A process according to claim 1 wherein the herbicidal composition is applied to weeds in the presence of cotton plants.

4. The process according to claim 1 wherein $R_4$, $R_5$ and $R_6$ are alkyl or haloalkyl of up to 18 carbon atoms, phenyl, halophenyl or lower alkyl phenyl, and wherein the said ester is alkyl, alkoxyalkyl or haloalkyl of up to 20 carbon atoms, mono- or di-halo phenyl and lower alkyl phenyl.

5. The process of claim 1 wherein the herbicidal compound is one of the said esters and the esters are phenyl, halo-substituted phenyl, and alkyl substituted phenyl of up to 18 carbon atoms in the alkyl chain.

6. The process of claim 1 where the herbicidal compound is one of the said amine salts and the amine salts are salts of amines of the formula

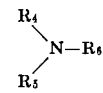

where $R_4$, $R_5$ and $R_6$ may be the same or different and are hydrogen, alkyl of up to 18 carbon atoms, aryl, halo-substituted alkyl of up to 18 carbon atoms, halo-substituted aryl and alkaryl of up to 18 carbon atoms in the alkyl chain.

7. The process of claim 1 wherein the herbicidal compound is of formula (A).

8. The process of claim 1 wherein the herbicidal compound is one of the said salts or esters of the acid selected from the group consisting of 4,4'-isopropylidene bis (2,5,6-trichlorophenoxy acetic acid), 4,4'-isopropylidene bis (3,5,-dichlorophenoxy acetic acid), 4,4'-isopropylidene bis (2,3-dichlorophenoxy acetic acid), 4,4'-isopropylidene bis (2,3,5-trichlorophenoxy acetic acid), 4,4'-isopropylidene bis (2,6-dichlorophenoxy acetic acid), and 4,4'-isopropylidene bis (3,6-dichlorophenoxy acetic acid).

* * * * *